US009887610B2

(12) United States Patent
Kim et al.

(10) Patent No.: US 9,887,610 B2
(45) Date of Patent: Feb. 6, 2018

(54) FLEXIBLE DEVICES, SYSTEMS, AND METHODS FOR HARVESTING ENERGY

(75) Inventors: Hanseup Kim, Salt Lake City, UT (US); Arhatha Bramhanand, Boise, ID (US); A. Henry Jauregui, Roswell, NM (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 654 days.

(21) Appl. No.: 14/128,550

(22) PCT Filed: Jul. 6, 2012

(86) PCT No.: PCT/US2012/045838
§ 371 (c)(1),
(2), (4) Date: Nov. 25, 2014

(87) PCT Pub. No.: WO2013/006832
PCT Pub. Date: Jan. 10, 2013

(65) Prior Publication Data
US 2015/0222166 A1    Aug. 6, 2015

Related U.S. Application Data

(60) Provisional application No. 61/571,883, filed on Jul. 7, 2011.

(51) Int. Cl.
*H02K 44/00*    (2006.01)
*H02K 35/02*    (2006.01)

(52) U.S. Cl.
CPC .................................. *H02K 35/02* (2013.01)

(58) Field of Classification Search
CPC .............................. H02K 44/00; H02K 35/02
See application file for complete search history.

(56) References Cited

U.S. PATENT DOCUMENTS

| | | | |
|---|---|---|---|
| 3,799,205 A | 3/1974 | Fisher et al. | |
| 4,421,118 A | 12/1983 | Dow et al. | |
| 5,362,987 A | 11/1994 | Cassaday et al. | |
| 5,554,922 A | 9/1996 | Kunkel | |
| 6,798,090 B2 * | 9/2004 | Cheung | H02K 35/02 290/1 A |
| 1,799,501 A1 | 4/2007 | Pei et al. | |
| 7,199,501 B2 | 4/2007 | Pei et al. | |
| 7,918,244 B2 | 4/2011 | Prakash et al. | |

(Continued)

OTHER PUBLICATIONS

International Search Report and Written Opinion, International Search Authority: US, Date of Completion: Sep. 12, 2012, PCT/US2012/045838, International Filing date Jul. 6, 2012.

(Continued)

*Primary Examiner* — Dang Le
(74) *Attorney, Agent, or Firm* — Michael Best & Friedrich LLP

(57) ABSTRACT

Embodiments of the present invention relate to systems, methods, and apparatus for harvesting energy by transforming mechanical energy into electrical energy. Particularly, the energy can be harvested by converting mechanical energy produced during operations or movements of a body (e.g., a vehicle, a person, a machine, etc.) that generate alternating or periodic force, which can be received by the energy harvesting device.

21 Claims, 7 Drawing Sheets

(56) References Cited

U.S. PATENT DOCUMENTS

| | | | |
|---|---|---|---|
| 8,322,363 | B2 | 4/2012 | Cartier et al. |
| 8,907,505 | B2 | 12/2014 | Fortier et al. |
| 9,303,628 | B2 | 4/2016 | Fortier et al. |
| 2006/0208579 | A1* | 9/2006 | Hohberger ............ H02K 7/1853 310/12.12 |
| 2009/0115283 | A1 | 5/2009 | Najafi et al. |
| 2009/0115285 | A1 | 5/2009 | Najafi |
| 2010/0277012 | A1* | 11/2010 | Kobayashi ............... B60K 6/24 310/30 |
| 2012/0019009 | A1 | 1/2012 | Fong et al. |
| 2012/0112473 | A1 | 5/2012 | Glynn |
| 2014/0068973 | A1 | 3/2014 | Krupenkin et al. |
| 2015/0108765 | A1 | 4/2015 | Choi |
| 2015/0222166 | A1 | 8/2015 | Kim et al. |

OTHER PUBLICATIONS

H. Kulah and K. Najafi, "An Electromagnetic Micro Power Generator Low-Frequencey Environmental Vibrations," MEMS 2003, pp. 237-240.

D.A. Wang and K.H. Chang, "Electromagnetic energy harvesting from flow induced vibration," J. Microelectronics, 41 (2010), pp. 356-364.

J. Kymissis, et al, "Parasitic Power Harvesting in Shoes," Proc. 2nd IEEE Int. Conf Wearable Computing 1998, pp. 132-139.

N.S. Shenck and J.A. Paradiso, "Energy Scavenging With Shoe-Mounted Piezoelectrics," IEEE Micro. 21 (2001), pp. 30-42.

N.H.Ching, H.Y.Wong, and W.J.Li, "A laser-micromachined multi-modal resonating power transducer for wireless sensing system," Sensors and Actuators, 97-98 (2002), pp. 685-690.

International Search Report and Written Opinion for Application No. PCT/US2012/045838 dated Oct. 4, 2012 (8 pages).

United States Patent Office Action for U.S. Appl. No. 14/533,703 dated Aug. 26, 2016 (15 pages).

United States Patent Office Action for U.S. Appl. No. 14/533,703 dated Apr. 21, 2017 (16 pages).

United States Patent Office Action for U.S. Appl. No. 14/533,703 dated Apr. 21, 2017 (16 pages).

* cited by examiner

FLEXIBLE DEVICES, SYSTEMS, AND METHODS FOR HARVESTING ENERGY

CROSS-REFERENCE TO RELATED APPLICATIONS

The present application claims the benefit of and priority to PCT Application No. PCT/US2012/045838, filed Jul. 6, 2012, entitled "Flexible Devices, Systems, and Methods for Harvesting Energy", which claims the benefit of and priority to U.S. Provisional Application No. 61/571,883, filed on Jul. 7, 2011, entitled "Microfluidic Energy Harvesting for High Force and Large Deflection Accommodation", each of which is incorporated by reference herein in its entirety.

BACKGROUND OF THE INVENTION

1. The Field of the Invention

This invention relates to systems, methods, and apparatus for converting mechanical energy into electrical energy.

2. Background and Relevant Art

Energy generation is relevant to numerous applications. Various electrical and electronic devices and appliance require electrical power for operation. Such devices and appliances typically receive power from a central source (e.g., a power line provided by a power company) or a portable source (e.g., battery, generator, etc.). Furthermore, the portable source of energy also can be an energy storage source, which may be more suitable than the central source for certain applications. For example, a typical cellular phone can incorporate an energy storage source, such as a battery, as a power source that may allow the cell phone to remain untethered from a stationary, central power source.

Typically, energy storage sources require replenishment or recharging. For instance, a battery may have to be recharged after a certain period of use. Other portable power sources, however, may produce energy and/or recharge the storage sources. For instance, portable power sources such as piezoelectric energy harvesting devices may convert mechanical energy (e.g., produced during use or operation of the device) into electrical energy, which may be used for operation of the device and/or stored in a storage source. Typical energy harvesting devices, however, are inflexible, fragile, may require high input energy, and often provide limited power options (e.g., low voltage).

Accordingly, there are a number of disadvantages of the portable energy sources that can be addressed.

BRIEF SUMMARY OF THE INVENTION

Embodiments of the present invention provide systems, methods, and apparatus for harvesting energy by transforming mechanical energy into electrical energy. Particularly, energy can be harvested by converting mechanical energy produced during operation or movement of a body (e.g., a vehicle, a person, a machine, etc.). In some instances, movements that provide the mechanical energy for an energy harvesting system or device can occur from an ordinary operation or use of a device or machine at random frequencies (e.g., vibrational forces during driving, alternatingly applied forces during walking, etc.). In one or more embodiments, the energy harvesting system can be adapted to accept various forms mechanical energy (e.g., various forms of kinematic movements or application of force), which can vary from one embodiment to another.

One embodiment includes a microfluidic device for harvesting energy. The device can include a channel configured to be pressurized and a fluid contained within the channel. The device also can include a plurality of magnetic elements separated from one another by nonmagnetic spacers, wherein the fluid is capable of moving the plurality of magnetic elements and the nonmagnetic spacers along the channel. Furthermore, the device can include a plurality of coils surrounding the channel, the coils comprising an electrically conductive material.

Another embodiment includes a system for harvesting energy. The system can incorporate a plurality of chambers and a plurality of channels connected to the plurality of chambers and forming fluid interconnection therebetween. Furthermore, the system also can incorporate a fluid located in the plurality of chambers and in the plurality of channels and a plurality of pistons sized and configured to pressurize the fluid in the plurality of chambers. The system also can include a plurality of coils surrounding the plurality of channels and a plurality of magnetic elements located in the plurality of channels, the magnetic elements being sized and configured to induce current in the plurality of coils. Additionally, the system can include a plurality of nonmagnetic spacers located in the plurality of channels and separating one magnetic element from another.

Yet another embodiment includes a method for harvesting energy from an alternating applied force. The method can include providing a fluid within a channel and positioning a plurality of magnetic elements separated by nonmagnetic elements within the channel. Additionally, the method can include providing a plurality of coils surrounding the channel and moving the plurality of magnetic elements together with the nonmagnetic elements by pressurizing the fluid. Moreover, the method can include harvesting current produced by the plurality of coils as a result of movement of the plurality of magnetic elements through the channel.

Additional features and advantages of exemplary embodiments of the invention will be set forth in the description which follows, and in part may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
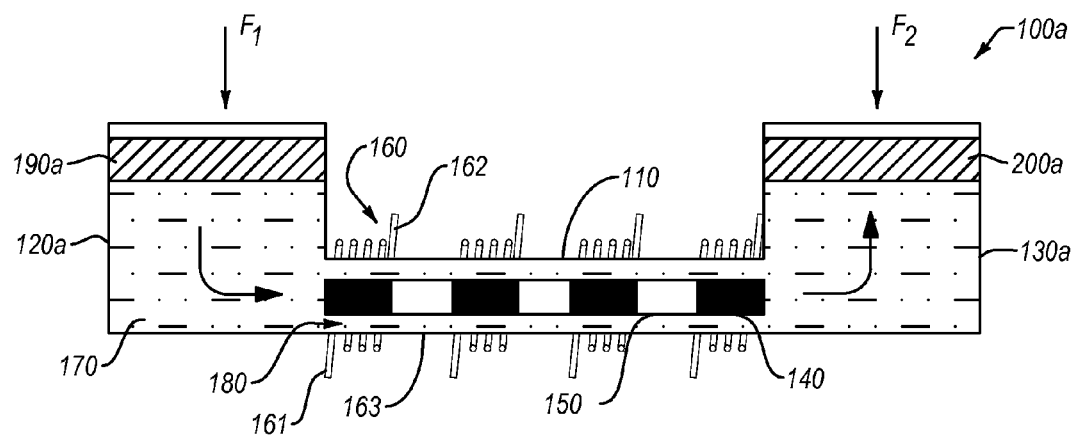
FIG. 1A illustrates a schematic representation of a microfluidic device for harvesting energy in accordance with one embodiment of the present invention.

Embodiments of the present invention provide systems, methods, and apparatus for harvesting energy by transforming mechanical energy into electrical energy. Particularly, the energy can be harvested by converting mechanical energy produced during operation or movement of a body (e.g., a vehicle, a person, a machine, etc.) into electrical energy. In some instances, movements that provide the mechanical energy for an energy harvesting system or device can occur from an ordinary operation or use of a device or machine (e.g., vibrational forces during driving, alternatingly applied forces during walking, etc.). In one or more embodiments, the energy harvesting system can be adapted to accept various forms mechanical energy (e.g., various forms of kinematic movements or application of force), which can vary from one embodiment to another.

In some embodiments, the energy harvesting system can transform movements produced by a body into electrical energy. Furthermore, the energy harvesting system can transform a pressure applied at one part of the system into electrical energy. For instance, the energy harvesting system can receive and/or transform the mechanical energy (e.g., force) into movement of one or more magnetic elements through a loop or series of loops (e.g., a coil) of conductive material, thereby inducing current therein. For simplicity, the term coil, as used herein, refers to one or more loops of electrically conductive material (e.g., a conductive wire).

In other words, the magnetic elements can impose a magnetic field onto the coil. As the magnetic elements move through the coil, the magnetic field or flux imposed onto the coil changes, which induces current flow in the coil. The current can then be channeled into a storage device, such as a capacitor or a battery, or can be used directly for powering an electric or electronic device.

To facilitate movement of the magnetic elements, the energy harvesting system also can include a channel that contains fluid, and the fluid can transmit pressure, force, and/or movement that occur in one part of the energy harvesting system to another part of the system. As used herein, the term "fluid," unless otherwise specified, refers to any compressible or incompressible fluid, which may be in liquid, semi-liquid (i.e., gel), or gas state. The fluid also can move the magnetic elements through the coil, thereby generating electrical energy. In at least one embodiment, the magnetic elements can be immersed in (or at least partially surrounded by) fluid, which can be (but does not have to be) the same fluid that transfers the mechanical energy through the energy harvesting system.

In some embodiments, the fluid also can de-amplify the force applied at one part of the energy harvesting system, as the force is transferred to another part of the system. For example, at a first end, the channel can couple to a first chamber that has a larger cross-sectional area than a second chamber that is coupled at a second end of the channel. Hence, a first force applied at the first chamber can be transferred through the energy harvesting system as a second, smaller force applied at the second chamber. More specifically, when the fluid is incompressible, the pressure of the fluid in the chambers and in the channel can remain the same, while the force applied at the first chamber, which has a larger cross-sectional area, can be transmitted through the system and produced as a second, smaller force, for instance, experienced at a piston located in the second chamber. Accordingly, by de-amplifying the first force, the energy harvesting system can accept large forces, without damaging or breaking components of the energy harvesting system. Additionally, the travel distance of the fluid and the magnets and the nonmagnetic spacers is amplified, resulting in larger magnetic flux changes under the given coil configuration and thus enhanced power output performance. In another example, the ratio of the channel and chamber diameter may be used to provide the hydraulic ratio of the system which may amplify the piston movement for increased power output and may de-amplify the force in each channel to avoid structural damages.

Figure 1B:
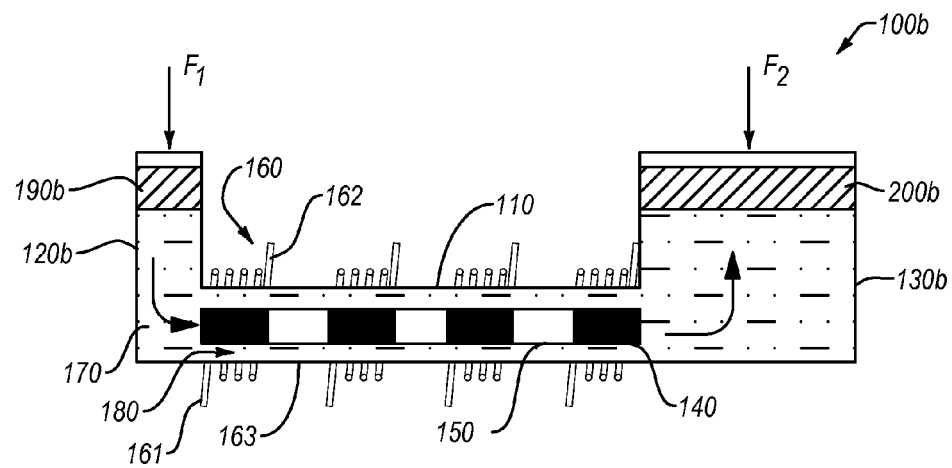
FIG. 1B illustrates a schematic representation of a microfluidic device for harvesting energy in accordance with another embodiment of the present invention.
Figure 1C:
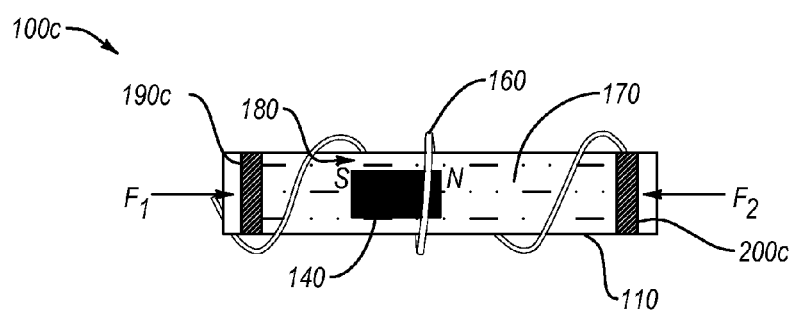
FIG. 1C illustrates a schematic representation of a portion of a microfluidic device for harvesting energy in accordance with yet another embodiment of the present invention.
Figure 2A:
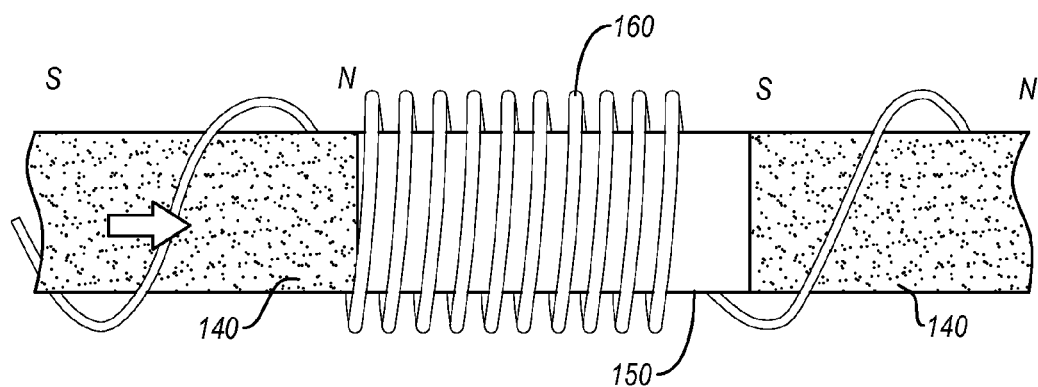
FIG. 2A illustrates a schematic representation of one stage in a sequence of a magnetic element passing through a coil of a microfluidic device for harvesting energy in accordance with one embodiment of the present invention.
Figure 2B:
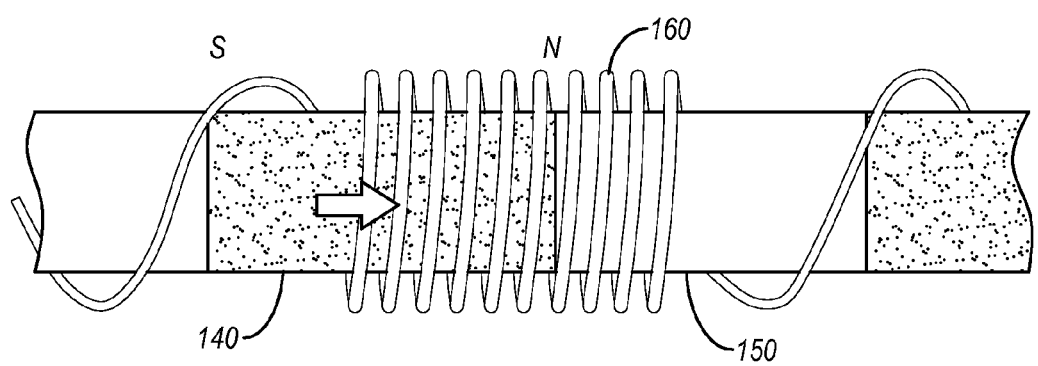
FIG. 2B illustrates a schematic representation of another stage in a sequence of a magnetic element passing through a coil of a microfluidic device for harvesting energy in accordance with one embodiment of the present invention.
Figure 2C:
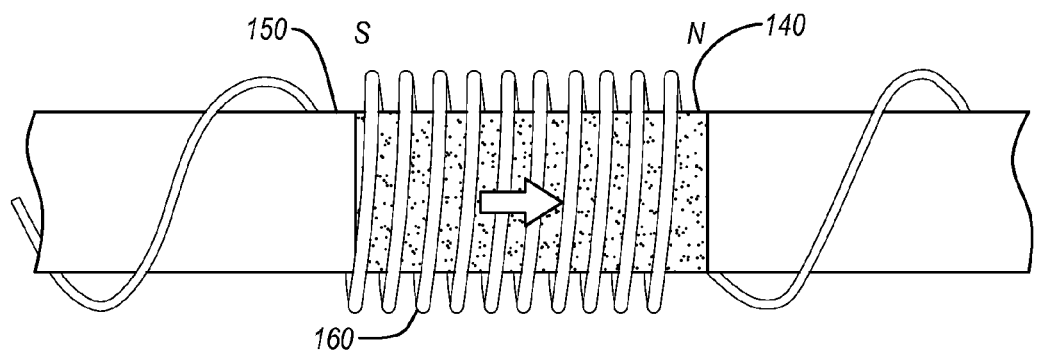
FIG. 2C illustrates a schematic representation of yet another stage in a sequence of a magnetic element passing through a coil of a microfluidic device for harvesting energy in accordance with one embodiment of the present invention.
Figure 2D:
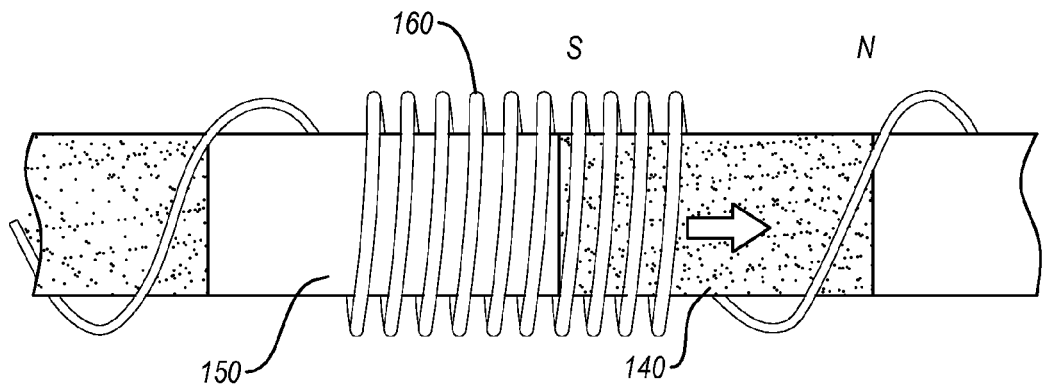
FIG. 2D illustrates a schematic representation of one other stage in a sequence of a magnetic element passing through a coil of a microfluidic device for harvesting energy in accordance with one embodiment of the present invention.
Figure 2E:
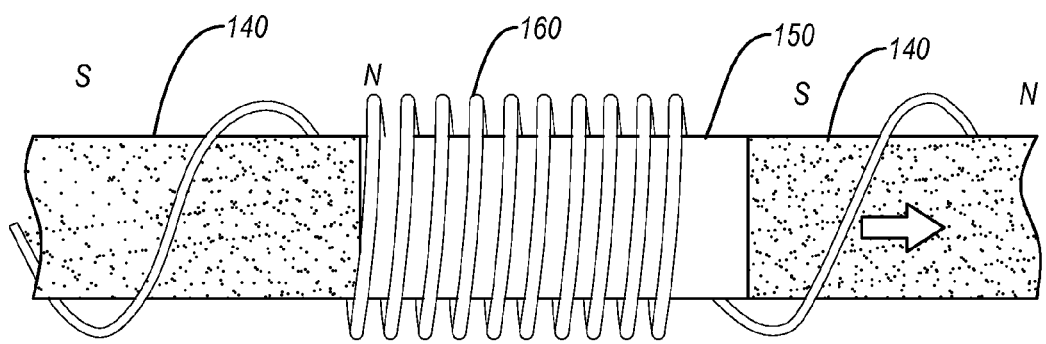
FIG. 2E illustrates a schematic representation of still another stage in a sequence of a magnetic element passing through a coil of a microfluidic device for harvesting energy in accordance with one embodiment of the present invention.

Referring now to the Figures, FIGS. 1A-1C illustrate schematic representations of energy harvesting devices 100a, 100b, 100c. More specifically, FIG. 1A illustrates an energy harvesting device 100a that includes a channel 110, a first chamber 120a, and a second chamber 130a in fluid communication with each other. It should be noted that the designations of the "first" and "second" chambers are intended for the purposes of illustrating the various embodiments described herein and are not meant to be limiting. Accordingly, as used herein, the terms "first" and "second" chambers are entirely interchangeable. The energy harvesting device 100a also may contain a plurality of magnetic elements 140, which may be separated from each other by nonmagnetic spacers 150.

Additionally, the channel 110 of the energy harvesting device 100a can be surrounded by a plurality of coils 160. Thus, as the magnetic elements 140 move through the channel 110, the magnetic elements 140 can induce current in the coils 160. Thereafter, the current can travel along a first lead 161 and a second lead 162 of each of the coils 160. Furthermore, each of the coils 160 can be separated by a gap 163.

The energy harvesting device 100a also can contain fluid 170 within the channel 110, first chamber 120a, and/or within the second chamber 130a. In one or more embodiments, the channel 110, first chamber 120a, and second chamber 130a may form a single container that has the same pressure of the fluid 170 throughout (e.g., when the fluid 170 is an incompressible fluid). In other words, the incompressible fluid 170 located within the first chamber 120a, channel 110, and second chamber 130a may have substantially the same pressure at any point within the container formed by the first chamber 120a, channel 110, and second chamber 130a. When a compressible fluid is used as the fluid 170, the pressure may vary throughout the chamber depending on the compressibility of the fluid and/or other components of the device 100a.

Moreover, the fluid 170 can provide separation between the magnetic elements 140 and/or the nonmagnetic spacers 150 on the one hand and inside walls of the channel 110 on the other hand. The fluid 170 can reduce friction between walls of the channel 110 and the magnetic elements 140 and nonmagnetic spacers 150. Furthermore, the fluid 170 can transmit mechanical energy received by the energy harvesting device 100a to movement of the magnetic elements 140 and the nonmagnetic spacers 150 along the channel 110. This transmission of mechanical energy may occur through direct pressure applied by the fluid and/or the friction or viscosity of the fluid as it passes the magnetic elements 140 and/or nonmagnetic spacers 150.

In some embodiments, the channel 110 can have an internal diameter in the range of about 1 mm to about 2 mm; about 1.5 mm to about 3 mm; about 2 mm to about 5 mm; and about 4 mm to about 10 mm. Although it may be possible to use larger sized components, smaller components are much more efficient at generating energy than much larger components. A smaller diameter of a channel component in relation to that of the chamber membrane enables the magnet component to travel longer distance through more than one coil segment, thus resulting in larger power generation. In addition, smaller component weigh less and significantly reduce friction loss in this type of device. That being said, the internal diameter of the channel 110 also can be greater than about 10 mm or smaller than about 1 mm. Accordingly, the magnetic elements 140 and/or nonmagnetic spacers 150 also can have a compatible diameter in one or more of the above ranges, such as to allow the magnetic elements 140 to move within the channel 110 (i.e., the magnetic elements 140 and/or the nonmagnetic spacers 150 can have sufficient clearance).

It should be noted that the channel 110, magnetic elements 140, nonmagnetic spacers 150, and combinations thereof can have other cross-sectional shapes and dimensions. For example, the channel 110 can have a substantially rectangular cross-section and can accept magnetic elements 140 and nonmagnetic spacers 150 that may have various shapes, including also substantially rectangular cross-sectional shapes. Generally, however, cross-sectional shape and dimensions of the channel 110, magnetic elements 140, and nonmagnetic spacers 150 can vary from one embodiment to another, depending on particular design requirements and/or preferences.

Hence, in at least one embodiment, cross-sectional shapes of the magnetic elements 140 and/or of the nonmagnetic spacers 150 can be substantially the same as the internal cross-sectional shape of the channel 110 plus a desired clearance 180. In other words, the clearance 180 may be present between the magnetic elements 140 and/or the nonmagnetic spacers 150 on the one hand and the inside dimensions of the channel 110 on the other hand. The clearance 180 can be appropriately sized such as to allow the magnetic elements 140 and the nonmagnetic spacers 150 to move along the channel 110 without impeding such movement. For example, the clearance 180 can be approximately 0.5 mm (on each side of the magnetic elements 140 and/or nonmagnetic spacers 150).

In other embodiments, the clearance 180 can be greater or less than about 0.5 mm. Particularly, the clearance 180 can be sufficiently small such as to minimize that amount of the fluid 170 that may flow through the clearance 180. Moreover, in some embodiments, the clearance 180 can be such as to allow no fluid 170 to pass therearound. In other words, the magnetic elements 140 and/or the nonmagnetic spacers 150 can function as a piston moving within the channel 110.

Any one of the channel 110, first chamber 120a, and second chamber 130a can comprise of a rigid material, a flexible material, or a combination thereof, which can be sufficient to retain the magnetic elements 140 therein. An appropriate selection of the material can be made based, at least in part, on the particular energy harvesting application of the energy harvesting device 100a as well as on the pressures that may be generated within the channel 110, first chamber 120a, and second chamber 130a. Accordingly, the channel 110, first chamber 120a, and/or second chamber 130a can entirely comprise a rigid material (e.g., ceramic, thermoplastic, etc.). Alternatively, a flexible material can be used for any part of or for the entire channel 110, first chamber 120a, and/or second chamber 130a. The flexible materials can include Polydimethylsiloxane (PDMS), Latex, Parylene, Benzocyclobutene (BCB), and SU-8, as an example.

Consequently, shapes and sizes of the channel 110, first chamber 120a, and/or second chamber 130a may remain substantially unchanged during operation of the energy harvesting device 100a (e.g., if a rigid material is used). Alternatively, the shapes and sizes of the channel 110, first chamber 120a, and/or second chamber 130a may change (e.g., depending on the applied/received forces and pressures), when at least a portion of the channel 110, first chamber 120a, and/or second chamber 130a is constructed from a flexible material.

Therefore, for example, as the shape of the channel 110 changes, so may change the required clearance 180, such as to allow the magnetic elements 140 and the nonmagnetic spacers 150 to move along the channel 110. Accordingly, the size of the clearance 180 also can depend on lengths of the individual magnetic elements 140 and nonmagnetic spacers 150 as well as on intended and/or anticipated changes of the shape of the channel 110 during operation.

For example, the channel 110 can bend, twist, or otherwise deform during the operation of the energy harvesting device 100a. Such deformations can interfere with movement of the magnetic elements 140 and the nonmagnetic spacers 150. Thus, for the channel 110 that may experience deformations during operation of the energy harvesting device 100a, the size of the clearance 180 may have to be larger than the size of the clearance 180 for the channel 110 that does not experience deformations during operation.

In one or more embodiments, the first chamber 120a and/or the second chamber 130a may be sealed. For instance, the first chamber 120a can include a first piston 190a. Similarly, the second chamber 130a can include a second piston 200a. The first piston 190a and/or the second piston 200a can be pistons that move within the respective first chamber 120a and the second chamber 130a.

Additionally or alternatively, however, the first piston 190a and/or the second piston 200a can be membranes, which can deflect into the respective first chamber 120a and the second chamber 130a, thereby causing increase in the pressure of the fluid 170. Furthermore, as described above, the first chamber 120a and/or the second chamber 130a can comprise flexible material. Accordingly, the first piston 190a and the second piston 200a can remain stationary with respect to the walls of the respective first chamber 120a and the second chamber 130a, and as the first piston 190a and/or the second piston 200a move, the first chamber 120a and/or the second chamber 130a can deform, such as to pressurize the fluid 170 therein. Particularly, the first piston 190a and/or the second piston 200a can be flexible membranes, which can stretch and deform and can return to their respective undeformed shapes and sizes.

As a first force $F_1$ is applied to the first piston 190a, the fluid 170 located within the first chamber 120a is pressurized and forced to flow toward the second chamber 130a (as indicated with an arrow in FIG. 1A). More specifically, the fluid 170 can flow through the channel 110 and toward the second chamber 130a. As the fluid 170 flows through the channel 110, the fluid 170 also can move the magnetic elements 140 and the nonmagnetic spacers 150 along the channel 110. As described above and further described below, movement of the magnetic elements 140 within the channel 110 can induce current in the coils 160.

As the fluid 170 enters the second chamber 130a, a counteractive second force $F_2$ applied to the second piston 200a can maintain the fluid 170 within the second chamber 130a. In other words, the second force $F_2$ maintains the fluid 170 within the container formed by the first chamber 120a, channel 110, and second chamber 130a. In at least one embodiment, the first force $F_1$ is greater than second force $F_2$ during at least a part of the time of operation of the energy harvesting device 100a. Consequently, as the first force $F_1$ is greater than the second force $F_2$, the fluid 170 can flow from the first chamber 120a, through the channel 110, and into the second chamber 130a. Such flow can continue until the first forces $F_1$ multiplied by the cross-section area of the first chamber 120a equals the second force $F_2$ multiplied by the cross-section area of the second chamber 130a.

As described above in connection with the first piston 190a, the second piston 200a also can move with respect to the walls of the second chamber 130a or can be stationary with respect thereto. Accordingly, as the fluid 170 enters the second chamber 130a, the second piston 200a can move outward to expand the volume of the second chamber 130a to accommodate the additional fluid 170 entering the second chamber 130a. Alternatively, however, the second chamber 130a can deform and expand (e.g., the second chamber 130a can be at least partially flexible, which may allow the second chamber 130a to expand). Such expansion can accommodate additional fluid 170 entering the second chamber 130a, while the second piston 200a remains stationary with respect to the walls of the second chamber 130a.

The first piston 190a and/or the second piston 200a can comprise rigid or flexible material. Accordingly, the effective shapes of the first piston 190a and/or the second piston 200a can remain substantially unchanged under the forces $F_1$ and $F_2$, when the first piston 190a and the second piston 200a are formed from the rigid material. Alternatively, a flexible first piston 190a and second piston 200a can deform in response to the respective forces $F_1$ and $F_2$ as well as to the pressure applied by the fluid 170.

Deformation of the first chamber 120a, second chamber 130a, first piston 190a, second piston 200a, and combinations thereof also can apply pressure onto the fluid 170. More specifically, such deformations can, at least in part, comprise the respective forces $F_1$ and/or $F_2$. For example, when the second chamber 130a and/or the piston 200a are in an outwardly deformed state (resulting from the fluid 170 entering the second chamber 130a), the material comprising the second chamber 130a and/or second piston 200a may tend to return into its undeformed state, thereby applying pressure to the fluid 170. Such applied pressure can create a potential of movement of the fluid 170 in the direction of the first chamber 120a.

Similarly, in a closed system, comprising the first chamber 120a, channel 110, and second chamber 130a, when the first piston 190a and/or the first chamber 120a are in a deformed state, the material comprising the first piston 190a and/or the first chamber 120a may tend to return to its undeformed state. Accordingly, when in an inwardly deformed state (e.g., the deformation caused by the first force $F_1$, such as to expel the fluid 170 from the first chamber 120a), the first chamber 120a and/or the first piston 190a can create a force opposing the first force $F_1$. Such opposing force also may tend to pull the fluid 170 back into the first chamber 120a upon release of or reduction in the first force $F_1$.

In some instances, the second force $F_2$ can be greater than the first force $F_1$. Accordingly, descriptions of the effects of applying the first force $F_1$ onto the first piston 190a are equally applicable to the second force $F_2$, as it is applied to the second piston 200a. Hence, the second force $F_2$ (when greater than the first force $F_1$) can cause the fluid 170 to exit the second chamber 130a and to flow into the first chamber 120a through the channel 110. Similarly, such flow of the fluid 170 through the channel 110 can move the magnetic elements 140, thereby inducing current in the coils 160.

Furthermore, in at least one embodiment, the application of the first $F_1$ and/or second forces $F_2$ can be intermittent or periodic. For example, first force $F_1$ can be applied to the first piston 190a for a period of time (e.g., sufficient amount of time to move the magnetic elements 140 through the channel 110). Subsequently, the first force $F_1$ can be reduced or removed from the first piston 190a, thereby allowing the fluid 170 to flow back into the first chamber 120a, for instance, by applying the second force $F_2$. Consequently, the magnetic elements 140 can move through the channel 110 in a first direction (e.g., toward the second chamber 130a) when the first force $F_1$ is applied to the first piston 190a. Thereafter, the magnetic elements 140 can move through the channel 110 in a second, opposite direction, when the first force $F_1$ is reduced or remove sufficiently to allow the second force $F_2$ to expel at least some of the fluid 170 from the second chamber 130a. Thus, as the first and second forces $F_1$, $F_2$ alternatingly move the fluid 170 through the channel 110, the magnetic elements 140 also can alternatingly move through the channel 110. Accordingly, the alternating movement of the magnetic elements 140 can induce continuous or near continuous current in the coils 160, as further described below.

In one or more embodiments, the first force $F_1$ or the second force $F_2$ can remain constantly applied to the respective first and second pistons 190a, 200a. For instance, the first force $F_1$ can be intermittently or periodically applied to the first piston 190a, while the second force step two can be constantly applied to the second piston 200a. Accordingly, when the first force $F_1$ is removed from the first piston 190a (or sufficiently reduced), the second force $F_2$ can move the fluid 170 out of the second chamber 130a, through the channel 110, and into the first chamber 120a. Thus, by intermittently applying the first force $F_1$ to the first piston 190a the magnetic elements 140 can alternatingly move and the first and second directions, thereby inducing continuous or near continuous current in the coils 160.

It should also be noted that the first and/or the second force $F_1$, $F_2$ may vary during application (i.e., the first and second forces $F_1$, $F_2$ may not be constant forces). In any event, whether by intermittently or periodically applying the first and second forces $F_1$ and $F_2$ to the energy harvesting device 100a or by intermittently or periodically applying one of the first and second forces $F_1$, $F_2$ and continuously applying the other force, the fluid 170 can be moved alternatingly between the first chamber 120a and the second chamber 130a. Hence, the fluid 170 can alternatingly move the magnetic elements 140 in the first and second directions along the channel 110, thereby generating current in the coils 160.

In at least one embodiment, the magnetic elements 140 also may have the same length as the nonmagnetic spacers 150. Furthermore, the coils 160 and gap 163 can have approximately the same lengths (as measured along the channel 110) as each of lengths of the magnetic elements 140 and/or the nonmagnetic spacers 150. In other words, the ratio between the lengths of the magnetic elements 140, the nonmagnetic spacers 150, the coils 160, and the gap 163 can be 1:1:1:1. For example, each or one or more of the magnetic elements 140 and/or of the nonmagnetic spacers 150 as well as the coils 160 and gaps 163 can have a length in the range between about 1 mm to about 2 mm, about 1.1 mm to about 1.5 mm; and about 2 mm to about 5 mm. Other lengths can be used, which may be less than about 1 mm and/or greater than about 5 mm.

Hence, in some embodiments, when the magnetic elements 140 move along the channel 110, the magnetic elements 140 can enter each of the coils 160 simultaneously (while each of the nonmagnetic spacers 150 enter the gap 163). In other words, for instance, as a first magnetic element 140 enters a first coil 160, a second magnetic element 140 can enter a second coil 160. Other ratios between the magnetic elements 140, nonmagnetic spacers 150, coils 160, and gaps 163 are possible. Accordingly, in other embodiments, entry of various magnetic elements 140 into corresponding coils 160 may not be synchronized.

As noted above, each of the coils 160 can have the first and second leads 161, 162. The first and second leads 161, 162 can connect the coils 160 in series or in parallel. When connected in series, the coils 160 can produce a higher voltage than when connected in parallel, which may be particularly useful for some applications. For example, a single channel 110 can produce an output voltage of approximately 1-2 V. Such single channel 110 also can produce approximately 1-3 mW of average power. This energy can be stored, as described above, in a capacitor, battery, other storage device, or combinations thereof.

As described below in further detail, movement of the magnetic elements 140 along the channel 110 can result in change in magnetic flux across the coils 160, which induces current in the coils 160 (i.e., generates electrical energy). Subsequently, the electrical energy can be stored and/or used for various applications. The amount of power generated by the energy harvesting device 100a can depend on the length of the channel 110 as well as on the dimensions of the magnetic elements 140, nonmagnetic spacers 150, and coils 160. For example, the length of the channel 110 can be in the range of about 5 mm to about 7 mm; about 6 mm to about 10 mm; and about 8 mm to about 12 mm. Other suitable lengths of the channel 110 can be used in the energy harvesting device 100a, and such lengths may be greater than about 12 mm or less than about 5 mm.

As described above, the energy harvesting device also can de-amplify the force applied thereto. Such de-amplification can permit subjecting the energy harvesting device to high forces, without damaging the internal components thereof. For instance, as illustrated in FIG. 1B, a de-amplifying energy harvesting device 100b can include a first chamber 120b and a second chamber 130b in fluid communication with the first chamber 120b through the channel 110.

Additionally, similar to the energy harvesting device 100a (FIG. 1A), the energy harvesting device 100b can include the magnetic elements 140 and/or the nonmagnetic spacers 150 disposed within the channel 110. The energy harvesting device 100b also may include the fluid 170, which can fill the channel 110, first chamber 120b, second chamber 130b, and combinations thereof. In some embodiments, the energy harvesting device 100b also includes a first piston 190b (in the first chamber 120b) and a second piston 200b (in the second chamber 130b).

Furthermore, the first chamber 120b, second chamber 130b, first piston 190b, and second piston 200b can be substantially the same as the first chamber 120a, second chamber 130a, first piston 190a, and first piston 200a (FIG. 1A), respectively, except as otherwise described below. In one embodiment, the first chamber 120b can have a smaller cross-sectional area than the second chamber 130b. Accordingly, for instance, when the fluid 170 is incompressible and the energy harvesting device 100b is in equilibrium (i.e., the fluid 170 is not moving), the first force $F_1$, applied at the first piston 190b, can be less than the second force $F_2$ applied at the second piston 200b.

Furthermore, movement of the first piston 190b and/or deformation of the first piston 190b and/or of the first chamber 120b that may occur in response to the first force $F_1$ can be greater than the corresponding movement of the second piston 200b and/or deformation of the second piston 200b and/or of the second chamber 130b. Particularly, the difference in displacement and/or deformation resulting in the first piston 190b and first chamber 120b on the one hand and the second piston 200b and second chamber 130b on the other hand can be proportional to the difference between the cross-section areas of the first chamber 120b and second chamber 130b.

Consequently, in one or more embodiments, the energy harvesting device 100b can be used to convert mechanical energy having high force and small displacement into electrical energy, in part, by de-amplifying the force. For instance the second force $F_2$ can be the mechanical energy delivered to the energy harvesting device 100b. Such second force $F_2$ can be alternating and, as described above, can expel the fluid 170 out of the second chamber 130b, through the channel 110, and into the first chamber 120b. Thus, this flow of the fluid 170 through the channel 110 can move the magnetic elements 140 in the second direction. Subsequently, the first force $F_1$ (e.g., generated by the deformed or stretched first piston 190b, which may be a flexible membrane) can move the fluid 170 as well as the magnetic elements 140 and the nonmagnetic spacers 150 in the first direction (opposite to the second direction).

De-amplification of the first force $F_1$ or the second force $F_2$, as it is transmitted through the fluid 170 of the energy harvesting device 100b, may result in reduced strength requirements for the second piston 200b or for the first piston 190b, respectively. Particularly, for instance, where first piston 190b is a membrane that provides the first force $F_1$, such membrane can experience lower stress. Hence, for example, the energy harvesting device 100b can receive high force without damaging or breaking the first membrane piston 190b.

Although the embodiments described above provide for two chambers interconnected by a channel, it is to be appreciated that this disclosure is not so limited. For instance, as illustrated in FIG. 1C, some embodiments include an energy harvesting device 100c that may incorporate the channel 110 and one or more magnetic elements 140 disposed therein. In at least one other embodiment, the energy harvesting device also can include one or more nonmagnetic spacers, which can separate the magnetic elements 140 one from another. Furthermore, the channel 110 also may include the fluid 170, in which the magnetic elements 140 can be located. Also, the energy harvesting device 100c can include the coils 160, which can comprise of one or more loops surrounding the channel 110.

In the illustrated embodiment, the energy harvesting device 100c also includes a first piston 190c and a second piston 200c positioned on opposing sides of the channel 110. Similar to the description above, the first force $F_1$ and the second force $F_2$ can be applied to the first piston 190c and second piston 200c, respectively. Unlike the energy harvesting devices 100a, 100b (FIGS. 1A, 1B) the first piston 190c and the second piston 200c can pressurize the fluid 170 directly within the channel 110. In other words, the energy harvesting device 100c may not have the first and second chambers, and the first piston 190c and/or the second piston 200c may move within the channel 110. Additionally or alternatively, the first piston 190c and/or second piston 200c also may deform with respect to the channel 110.

In other embodiments, however, the energy harvesting device 100c can have the first and second chambers integrated into the channel 110 (i.e., the chambers can be substantially aligned with the channel 110). Thus, as described above, the first and the second chamber can have substantially the same cross-sectional area, such that the energy harvesting device 100c does not provide any de-amplification of force. Alternatively, the first and second chambers can have different cross-sectional areas, such as to provide de-amplification of force (as described above in connection with FIG. 1B). For instance, the channel 110 can be tapered or can have one or more steps, which reduce the cross-sectional area of the channel 110 and/or form the first and/or the second chamber in alignment with the channel 110.

Figure 3:
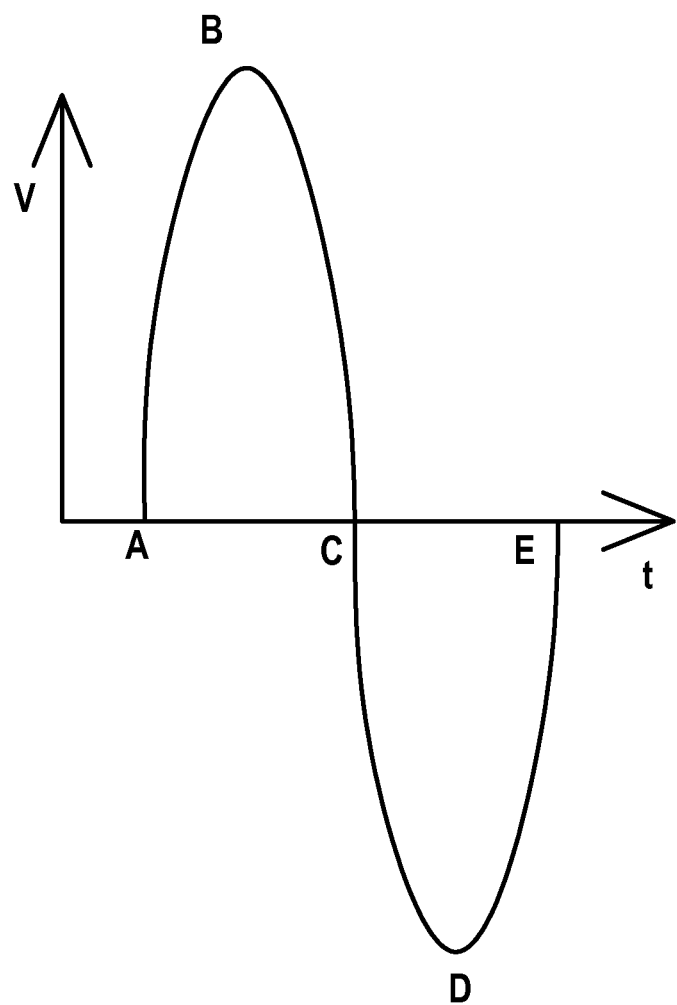
FIG. 3 illustrates a graph of voltage vs. time, representative of the voltage generated by the magnetic element passing through the coil at each stage illustrated in the FIGS. 2A-2E.

As described herein, the magnetic elements 140 can induce current in the coils 160, as the magnetic elements 140 move along the channel 110. More specifically, as illustrated in FIGS. 2A-2E and 3, the magnetic elements 140 can move in the first direction together with the nonmagnetic spacers 150. As each of the magnetic elements 140 passes through a corresponding coil 160, the movement of the magnetic elements 140 inside such coils 160 can induce current in each of such coils 160. FIG. 3 illustrates the change in voltage with respect to time, as the magnetic elements 140 move through the coil 160. Particularly, points A, B, C, D, and E illustrate voltage produced by the magnetic elements 140 at the different positions along the coils 160, illustrated in corresponding FIGS. 2A-2E.

The power output of the coils 160 can vary depending on the number of windings as well as on the diameter of wire used in the coils 160. Particularly, as the diameter of the wire is decreased, the resistance will increase proportionately and will reduce the overall amount of power output. For example, a 1000 μm diameter wire can be used for the coils 160. Other diameters, which may be greater or smaller than the nonmagnetic spacers 1000 μm, can be used for the coils 160. Furthermore, the coils 160 may have one or more layers. In some embodiments, a single layer of windings may form the coils 160. In other embodiments, however, the coils 160 can be formed from multiple layers of windings, which may improve the performance (i.e., increase the power output) of the energy harvesting device.

Figure 4A:
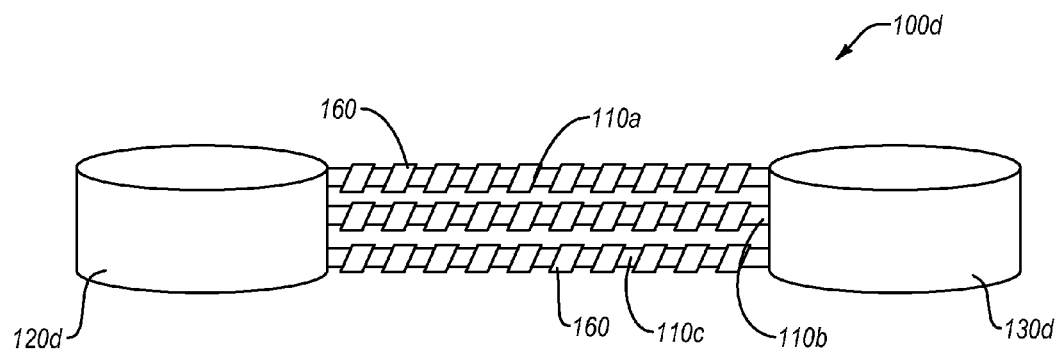
FIG. 4A illustrates a perspective view of a schematic representation of a microfluidic device for harvesting energy in accordance with one embodiment of the present invention.

Accordingly, as noted above, movement of the magnetic elements 140 can transform mechanical energy into electrical energy. Furthermore, such movement of the magnetic elements 140 can occur in response to movement the fluid located within a single channel 110 (e.g., the fluid may push the magnetic elements 140 along the channel 110). This disclosure, however, is not so limited. For instance, as illustrated in FIG. 4A, an energy harvesting device 100e can include first and second chambers 120d, 130d connected by multiple channels. For example, the first and second chambers first chamber 120b, 130b can pressurize and move the fluid located in a first, second, and third channels 110a, 110b, 110c, which, in turn, can move the magnetic elements as well as nonmagnetic spacers along the channels 110a, 110b, 110c, and through the coils 160.

Figure 4B:
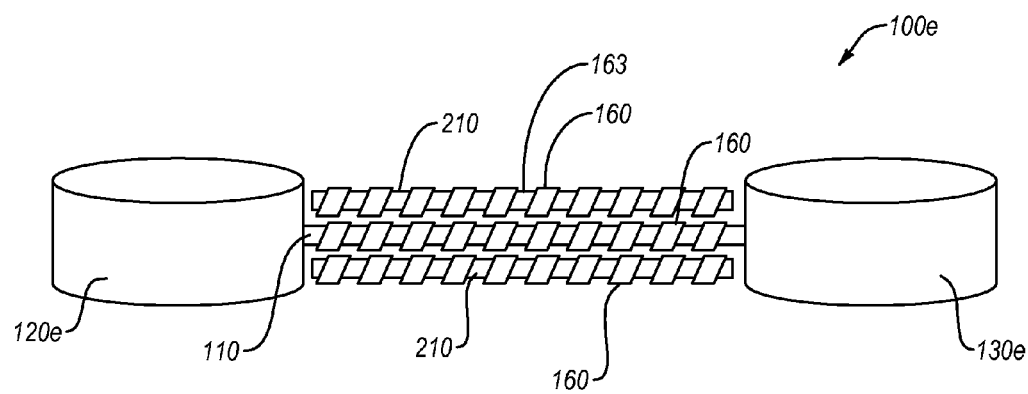
FIG. 4B illustrates a perspective view of a schematic representation of a microfluidic device for harvesting energy in accordance with another embodiment of the present invention.

Consequently, the energy harvesting device 100d can have multiple channels connecting opposing chambers, which may increase efficiency and/or decrease the size of the energy harvesting device 100d. In yet other embodiments, the energy harvesting device can include multiple channels, at least one of which is not in fluid communication with either the first chamber, the second chamber, or both. For example, as illustrated in FIG. 4B, an energy harvesting device 100e can include the channel 110 that connects the first chamber 120e to a second chamber 130e, such that the fluid can pass from the first chamber 120b, through the channel 110, and into the second chamber 130e.

The first chamber 120e and the second chamber 130e can be substantially the same as the first chamber 120a and the second chamber 130a (FIG. 1A), respectively. The energy harvesting device 100e also can include one or more coils 160 and one or more magnetic elements as well as one or more nonmagnetic spacers located within the channel 110. Furthermore, similar to the energy harvesting device 100a, the energy harvesting device 100e can receive mechanical energy, which can be translated into movement of the magnetic elements along the channel 110 and through the coils 160.

The energy harvesting device 100e also can include one or more parasitic channels 210. The parasitic channels 210 can be unconnected to any chamber. Similar to the channel 110, the parasitic channels 210 also can be surrounded by the coils 160. Furthermore, the parasitic channels 210 may contain one or more magnetic elements separated from each other by the nonmagnetic spacers 150.

The magnetic elements located in the channel 110 can attract the magnetic elements located in the parasitic channels 210. Moreover, movement of the magnetic elements located in the channel 110 can induce similar movement of the magnetic elements located in the parasitic channels 210 (i.e., the distance, magnetic element orientation, and strength of the magnetic field can be such as to create sufficient attraction between the magnetic elements sufficient to move one magnetic element in response to movement of the other magnetic element). In other words, the magnetic elements located in the channel 110 can affect movement of the magnetic elements located in the parasitic channels 210 in the first and second directions.

The parasitic channels 210, similar to the channel 110, also may include fluid therein. Such fluid may fill the parasitic channels 210 entirely or partially. Furthermore, in some embodiments, the parasitic channels 210 may remain at least partially open, such as to allow exchange of fluid with outside (e.g., exchange of air). Moreover, the fluid in the parasitic channels 210 may provide lubrication between the parasitic channels 210 and the magnetic elements and spacers within the parasitic channels 210. The parasitic channels 210 also may have a partial vacuum (as the fluid is not required to move the magnetic elements along the parasitic channels 210). Consequently, the parasitic channels 210 may be easier and/or cheaper to manufacture and maintain, which can reduce manufacturing and operating costs of the energy harvesting device 100e.

The components of the parasitic channels 210 may be the same as or different from the components of the channel 110 (e.g., magnetic elements, spacers, coils, etc.). For example, the components in the parasitic channels may vary in size, shape, strength, other characteristics, or combinations thereof.

Figure 5:
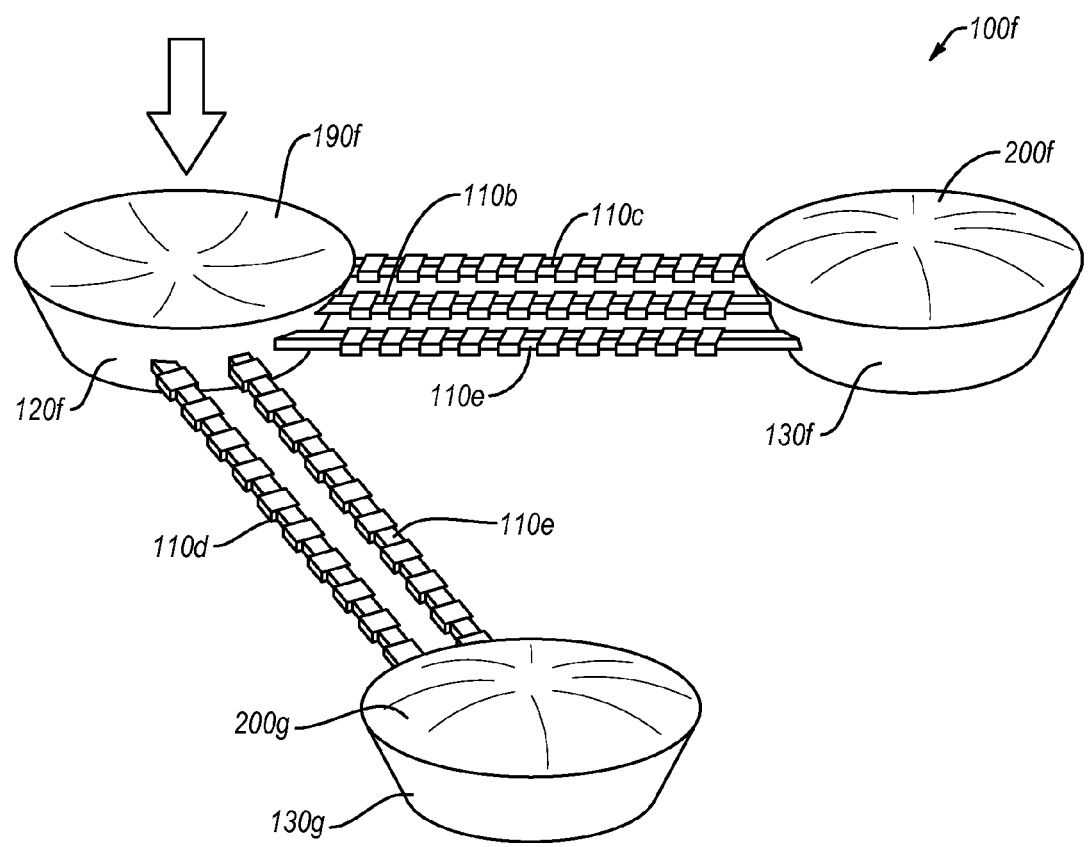
FIG. 5 illustrates a perspective view of a microfluidic device for harvesting energy in accordance with one embodiment of the present invention.

Similarly, the energy harvesting device can have multiple chambers that pressurize the fluid within one or more channels connected thereto. For example, as illustrated in FIG. 5, an energy harvesting device 100f can have a first chamber 120f, a second chamber 130f, and another second chamber 130g. The first and second chambers 120f, 130f can be connected one to another with one or more channels, such as a first channel 110a, a second channel 110b, and a third channel 110c. Similarly, the first and second chambers 120f, 130g can be connected one to another with one or more channels, such as a fourth channel 110d and a fifth channel 110e.

The first and second chambers 120f, 130f and the second chamber 130g can have respective pistons 190f, 200f, 200g. In the illustrated embodiment, the pistons 190f, 200f, 200g can be membranes that can deform in response to forces applied thereto. In other embodiments, the pistons 190f, 200f, 200g can have other configurations, as described above. Furthermore, the first and second chambers 120f, 130f and the second chamber 130g can be substantially the same as or different from the first chamber 120a and/or the second chamber 130a (FIG. 1A). Likewise, the channels 110a, 110b, 110c, 110d, 110e can be substantially the same as or different from the channel 110 (FIG. 1A).

Thus, as the force is received by the first piston 190f, and the fluid is pressurized by the piston 190f, the fluid can move toward both the second chamber 130f as well as toward the second chamber 130g. Accordingly, the force can move the magnetic elements located in one or more channels connecting the first chamber 120f to the second chamber 130f as well as the magnetic elements located in the channels connecting the first chamber 120f to the second chamber 130g. In other words, the magnetic elements located in the first, second, third, fourth, and fifth channels 110a, 110b, 110c, 110d, 110e can move in the first direction.

Likewise, a force applied to the second and/or third chambers 130f, 130g can pressurize and urge the fluid to flow toward the first chamber 120f, thereby moving the magnetic elements in the second direction. Moreover, in some embodiments, the first piston 190f and the first chamber 120f can be sufficiently rigid, such as to largely resist deformation and/or movement when fluid enters the first chamber (e.g., in response to the force applied on the second piston 200f. Hence, fluid can flow through the first, second, and third channels 110a, 110b, 110c, into and through the first chamber 120f, through the fourth and fifth channels 110e, 110d, and into the third chamber 130g. Consequently, the fluid can move the magnetic elements located in the first, second, and third channels 110a, 110b, 110c in the first direction, while moving the magnetic elements located in the fourth and fifth channels 110d, 110e in the second direction.

Figure 6A:
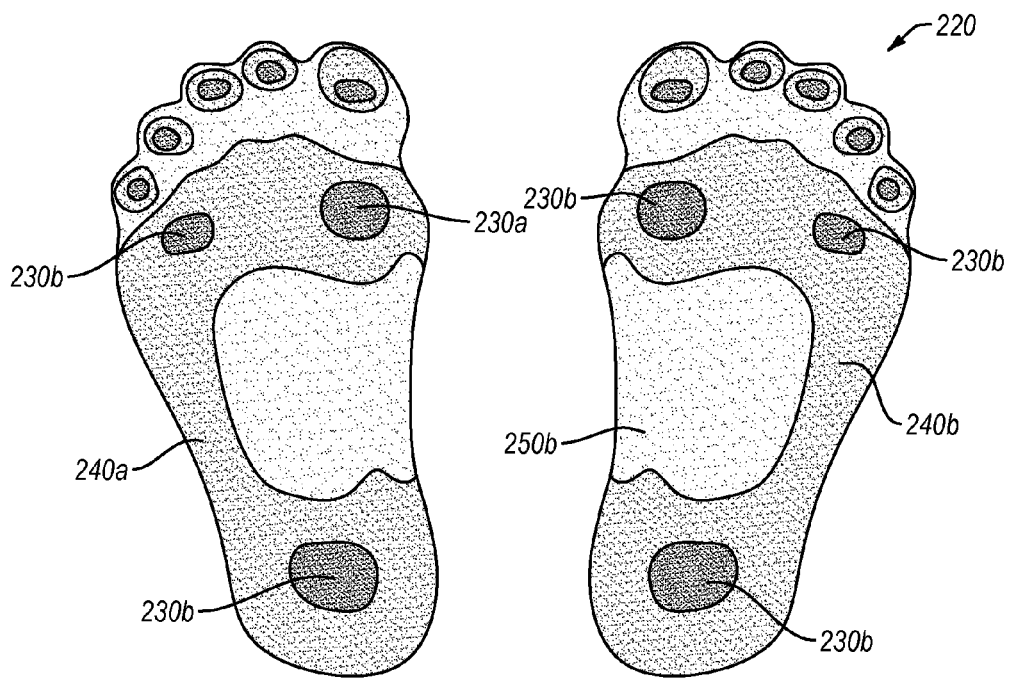
FIG. 6A illustrates a schematic of pressure areas on human feet when a person is in a standing position.
Figure 6B:
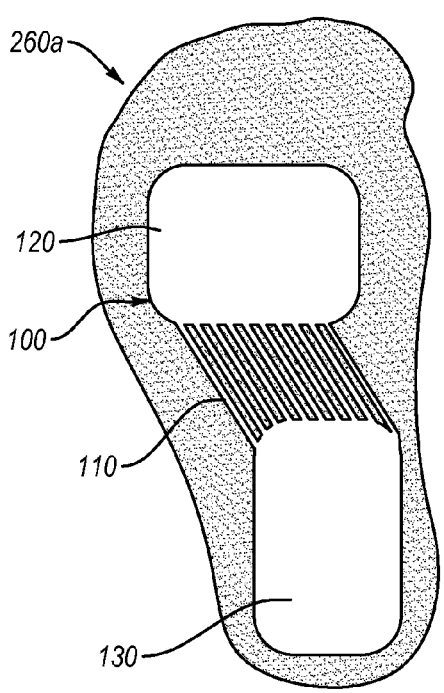
FIG. 6B illustrates a schematic of a microfluidic device for harvesting energy incorporated into a shoe in accordance with one embodiment of the present invention.

Further embodiments also include an energy harvesting system, which can include multiple devices of various shapes, sizes, and configurations. For instance, such system can be used to convert some of the mechanical energy generated by a person's feet during walking. FIG. 6A illustrates various pressure areas on the person's feet 220. Particularly, the feet 220 can have one or more pressure areas, such as high pressure areas 230a, 230b, medium pressure areas 240a, 240b, and low pressure areas 250a, 250b. As the person walks, the pressure can be transferred from the feet (at the pressure areas) to the energy harvesting system.

For example, an energy harvesting system 260a can include an energy harvesting device 100 that may have two chambers (a first chamber 120 and a second chamber 130) connected by multiple channels 110. Accordingly, as the person walks and intermittently applies pressure to the first and second chambers 120, 130, the fluid within the channels 110 can alternatingly move the magnetic elements in the first and second directions. As described above, such movement of the magnetic elements can induce current in the coils surrounding the channel 110.

Moreover, also as noted above, the coils can be connected in series and/or in parallel. Providing a sufficient number of the channel 110 and corresponding coils can produce a desired power output. For instance, the various coils can be connected in series to produce a desired voltage (e.g., 9V, 12V, etc.) as may be required by a particular device.

Figure 6C:
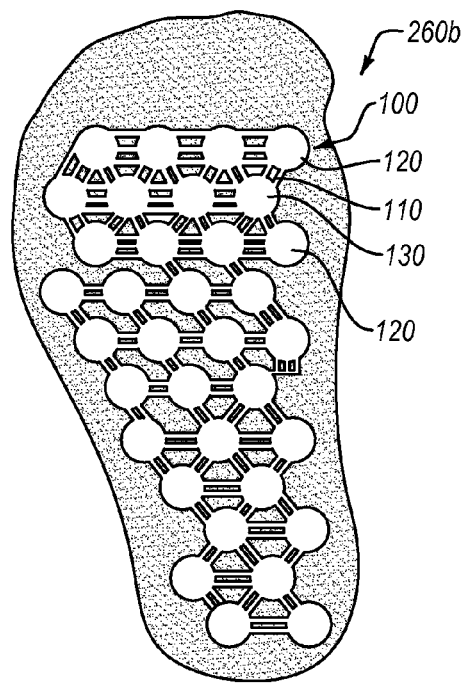
FIG. 6C illustrates a schematic of a microfluidic device for harvesting energy incorporated into a shoe in accordance with another embodiment of the present invention.

In another embodiment, an energy harvesting system 260b can include multiple interconnected energy harvesting devices 100, as illustrated in FIG. 6C. More specifically, each of the energy harvesting devices 100 can include one or more first chambers 120 and one or more second chambers 130 connected through the multiple channels 110. Furthermore, multiple first and second chambers 120, 130 can be interconnected through multiple channels 110. Consequently, in response to forces applied to various portions of the energy harvesting system to 260b, magnetic elements located in the channels 110 can move alternatingly in the first and second directions, thereby converting mechanical energy into electrical energy.

The energy harvesting system 260a, 260b can be used for powering various accessories, which can be connected to or incorporated into footwear. Hence, the energy harvesting system 260a, 260b can power and support independent (i.e., unconnected to anything else) lights, position sensors, heating elements, etc. or can provide supplemental power and support for dependent elements. For example, position sensors powered by the energy harvesting system 260a, 260b, can provide independent positioning capabilities, which may be useful in survival or other circumstance, in which the person may not have access (or may only have partial or temporary access) to electrical power. In other words, the energy harvesting system 260a, 260b can provide power to the positioning system, and such power can be generated and/or stored while the person is walking. Hence, for instance, in a rescue situation, the person can walk to generate electrical power, which, in turn, can power a positioning device (e.g., a locator beacon) that can be traced by rescuers. Similarly, the energy harvesting system 260a, 260b can generate sufficient power to power a heater, which can keep the person's feet at a comfortable temperature in cold environments.

Additionally, in at least one other embodiment, the energy harvesting system can be incorporated into other devices and/or used in various environments. Moreover, the energy harvesting system can serve both as a sensor (e.g., a pressure sensor) as well as a power source. For example, the energy harvesting system can be incorporated into or under a road surface. Thus, when a vehicle's wheels apply pressure to the portion of the road containing the energy harvesting system, the fluid contained in the interconnecting channels (e.g., as illustrated in FIG. 6C) can alternatingly flow from one portion of the system into another. Hence, the magnetic elements can move through the coils of the system, thereby converting mechanical energy into electrical.

Consequently, for instance, vehicle's entry into an intersection can be sensed by detecting a change in voltage at the leads of the coils. Also, the energy generated by the energy harvesting system (as a result of the forces applied by the vehicle) can power lights, sound generation, etc. Hence, the energy harvesting system can provide visual and/or audio warnings, which can communicate various information to pedestrians and drivers.

As described above, the energy harvesting device as well as the energy harvesting system can accept large magnitude forces, and in some instances where required, can de-amplify such forces. Accordingly, the energy harvesting device as well as the energy harvesting system can be used in numerous high force applications. Examples of such applications include various hydraulic systems that can incorporate the energy harvesting device and/or the energy harvesting system. For instance, the energy harvesting device can be incorporated into hydraulic braking systems, hydraulic damper systems, etc., and can harvest energy through those systems by absorbing and/or converting the flow of hydraulic fluid into movement of the magnetic elements through corresponding coil. Thus, the scope of the applicability and application of this invention is not limited to the embodiments disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A microfluidic device for harvesting energy, the device comprising:
   a channel configured to be pressurized; a fluid contained within the channel;
   one or more chambers in fluid communication with the channel;
   a flexible membrane configured to deform in response to a force applied thereto, thereby pressurizing the fluid;
   a plurality of magnetic elements separated from one another by nonmagnetic spacers, wherein the pressurized fluid is capable of moving the plurality of magnetic elements and the nonmagnetic spacers along the channel; and
   a plurality of coils surrounding the channel, the coils comprising an electrically conductive material.

2. The device of claim 1, further comprising one or more pistons disposed in or connected to the one or more chambers, the one or more pistons being configured to pressurize the fluid.

3. The device of claim 2, wherein at least one of the one or more pistons includes the flexible membrane.

4. The device of claim 3, wherein the flexible membrane is configured to deform outward in response to force applied by the pressurized fluid.

5. The device of claim 3, wherein at least one of the one or more chambers is comprised of the flexible material and configured to deform in response to a force applied thereto, thereby pressurizing the fluid by the ratio of hydraulic amplification and de-amplification.

6. The device of claim 1, wherein: the magnetic elements have a first length;
   the nonmagnetic spacers have a second length; and
   the first length is substantially the same as the second length.

7. The device of claim 1, wherein the one or more coils of the plurality of coils are separated one from another by gaps.

8. The device of claim 7, wherein:
   the gaps have a fourth length measured along the channel; and
   the fourth length is substantially the same as the third length.

9. The device of claim 1, wherein the channel comprises the flexible material, and the channel is configured to be bent.

10. A microfluidic device for harvesting energy, the device comprising:
    a channel configured to be pressurized;
    a fluid contained within the channel;
    one or more chambers in fluid communication with the channel;
    a plurality of magnetic elements separated from one another by nonmagnetic spacers, wherein the fluid is capable of moving the plurality of magnetic elements and the nonmagnetic spacers along the channel;
    a plurality of coils surrounding the channel, the coils comprising an electrically conductive material; and
    wherein the one or more chambers comprise a first chamber and a second chamber, and the first chamber has a smaller cross-sectional area than the second chamber.

11. The device of claim 10, further comprising one or more pistons disposed in or connected to the one or more chambers, the one or more pistons being configured to pressurize the fluid.

12. A system for harvesting energy, the system comprising: a plurality of chambers;
    a plurality of channels connected to the plurality of chambers and forming fluid interconnection therebetween;

a fluid located in the plurality of chambers and in the plurality of channels;

a plurality of pistons sized and configured to pressurize the fluid in the plurality of chambers;

a plurality of coils surrounding the plurality of channels;

a plurality of magnetic elements located in the plurality of channels, the magnetic elements being sized and configured to induce current in the plurality of coils; and a plurality of nonmagnetic spacers located in the plurality of channels and separating one magnetic element from another.

13. The system of claim 12, further comprising: one or more parasitic channels, wherein:

the one or more parasitic channels are disconnected from the plurality of chambers, and each of the one or more parasitic chambers contains one or more magnetic elements separated by one or more nonmagnetic spacers; and a plurality of coils surrounding the one or more parasitic channels.

14. The system of claim 12, wherein:

one or more chambers of the plurality of chambers comprise a flexible material, the one or more chambers being configured to deform in response to an applied force.

15. The system of claim 14, wherein:

one or more pistons of the plurality of pistons comprise a flexible material, the one or more pistons being connected to the one or more chambers; and the one or more pistons and the one or more chambers being configured deform together in response to the applied force.

16. A method for harvesting energy from an alternating applied force, the method comprising:

providing a fluid within a channel;

positioning a plurality of magnetic elements separated by nonmagnetic elements within the channel;

providing a plurality of coils surrounding the channel;

deforming a flexible membrane in response to a force applied thereto, thereby pressurizing the fluid;

moving the plurality of magnetic elements together with the nonmagnetic elements by the pressurized fluid;

harvesting current produced by the plurality of coils as a result of movement of the plurality of magnetic elements through the channel.

17. The method of claim 16 wherein moving the plurality of magnetic elements together with the nonmagnetic elements comprises moving the plurality of magnetic elements together with the nonmagnetic elements in a first direction and subsequently moving the plurality of magnetic elements together with the nonmagnetic elements in a second direction, wherein the second direction is opposite to the first direction.

18. The method of claim 16 wherein the plurality of coils are connected in series.

19. The method of claim 18 wherein moving the plurality of magnetic elements together with the nonmagnetic elements comprises moving the plurality of magnetic elements together with the nonmagnetic elements in a first direction and subsequently moving the plurality of magnetic elements together with the nonmagnetic elements in a second direction, wherein the second direction is opposite to the first direction.

20. The method of claim 16 wherein the plurality of coils are connected in series.

21. A method for harvesting energy from an alternating applied force, the method comprising:

providing a fluid within a channel and one or more chambers, wherein the one or more chambers comprise a first chamber and a second chamber, and the first chamber has a smaller cross-sectional area than the second chamber;

positioning a plurality of magnetic elements separated by nonmagnetic elements within the channel;

providing a plurality of coils surrounding the channel;

moving the plurality of magnetic elements together with the nonmagnetic elements by the fluid;

harvesting current produced by the plurality of coils as a result of movement of the plurality of magnetic elements through the channel.

* * * * *